United States Patent [19]

Villo, deceased et al.

[11] 4,005,740
[45] Feb. 1, 1977

[54] ROTATION RESISTANT NUT

[75] Inventors: Joseph P. Villo, deceased, late of Rydal, Pa.; by Jean Villo, co-executrix, Rydal; by The Fidelity Bank, co-executor, Philadelphia, both of Pa.; Charles A. Wilson, Williamstown, N.J.

[73] Assignee: Standard Pressed Steel Co., Jenkintown, Pa.

[22] Filed: Aug. 24, 1972

[21] Appl. No.: 283,345

[52] U.S. Cl. .......................... 151/41.73; 151/21 C
[51] Int. Cl.² ........................................ F16B 39/22
[58] Field of Search ............ 151/21 C, 19 A, 41.72, 151/41.73

[56] References Cited

UNITED STATES PATENTS

| 721,352 | 2/1903 | Applin | 151/19 A |
|---|---|---|---|
| 1,193,025 | 8/1916 | Klein | 151/21 C |
| 1,227,627 | 5/1917 | Kennedy | 151/41.73 |
| 2,544,304 | 3/1951 | Eckenbeck et al. | 151/41.73 |
| 2,788,044 | 4/1957 | Dock | 151/21 C |
| 3,399,409 | 9/1968 | Breed | 151/41.73 |
| 3,443,617 | 5/1969 | Whiteside et al. | 151/41.73 |

Primary Examiner—Roy D. Frazier
Assistant Examiner—Thomas J. Holko
Attorney, Agent, or Firm—Andrew L. Ney; Aaron Nerenberg; Robert P. Seitter

[57] ABSTRACT

A rotation resistant nut having an internally threaded nut body and having a portion of the exterior surface of the nut body provided with an irregular configuration. The rotation resistant nut is adapted to be used as an insert-type nut and upon installation of the nut into a round hole in a workpiece having a diameter smaller than the major diameter of the nut, the workpiece deforms the nut body so that the internal threads of the nut become distorted to create a prevailing torque locking characteristic between the internal threads of the nut and a cooperating threaded male fastener.

5 Claims, 6 Drawing Figures

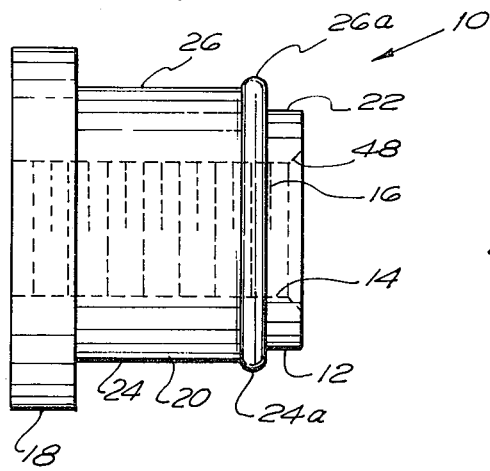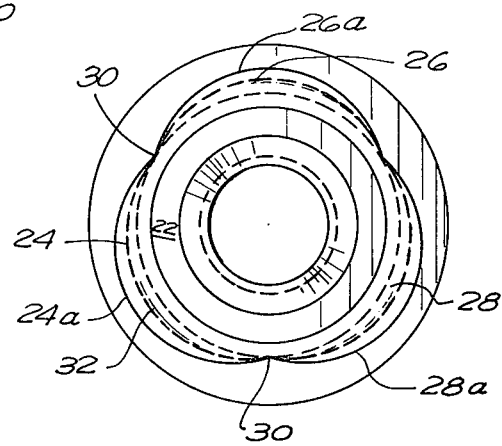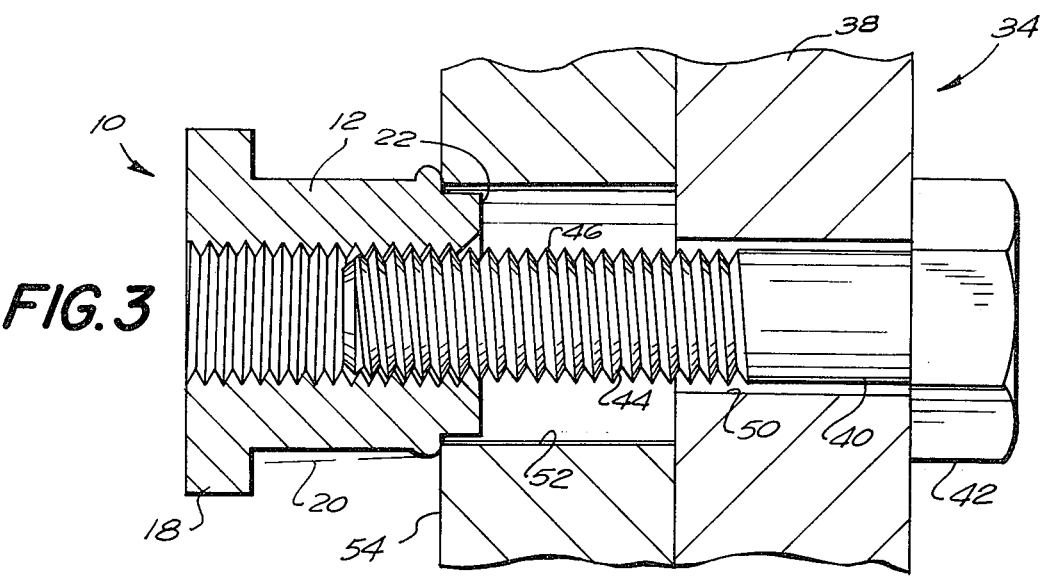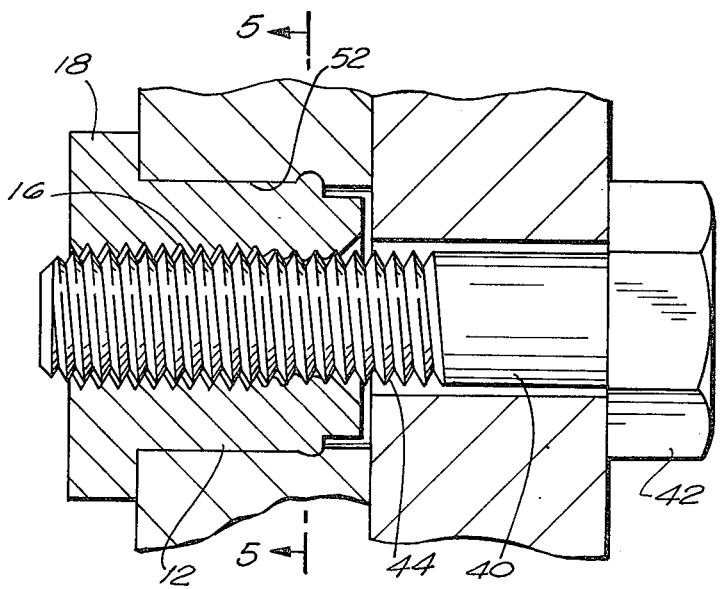

ROTATION RESISTANT NUT

The present invention relates to rotation resistant fasteners and more particularly to a rotation resistant insert-type nut.

In many joint applications utilizing threaded fasteners such as nuts it is necessary that the nut member be positively secured to a mating threaded male fastener, such as bolt, so that the nut or bolt does not back off and loosen from mating engagement and destroy the structural integrity of the assembled joint. An anti-rotation resistant property is especially important where the joint is subject to vibration and stress and thus it becomes critical to insure that the nut remains in the installed position without backing off.

Heretofore, proposed solutions to the problem of preparing a rotation resistant nut have suggested radially inwardly deforming a nut body once it has been installed on a threaded bolt or to form a gripping surface on the internal thread configuration of the nut so as to create an interference fit between the nut body and the threaded bolt. Such solutions to the problem while generally effective to provide a rotation resistant nut for a first time installation do not lend themselves to a nut which exhibits a high reusability factor with the same repeated degree of maintaining a desired level of prevailing locking torque on the assmebled fastener.

It is thus an object of the present invention to provide a rotation resistant fastener such as a nut which has a high reusability factor and maintains a predetermined level of prevailing locking torque through a repeated number of installations.

It is a further object of the present invention to provide a rotation resistant fastener which is economical to manufacture and relatively simple to use.

A further object of the present invention is to provide a rotation resistant fastener to provide a joint that is relatively inexpensive to assemble when using the rotation resistant fastener of the present invention.

These and other objects of the present invention are accomplished by providing a nut body which has a portion of the nut body with an irregular exterior configuration, for example a plurality of spaced lobular protrusions. The nut is designed to be installed as an insert into a round hole in one or more of the workpieces to be joined and the hole in which the nut is installed has a diameter smaller than the major exterior diameter of the nut. When installed in the hole, the workpiece distorts the nut body and deforms it radially inwardly as the nut seats within the hole in the workpiece and this deformation distorts the threaded inner diameter of the nut to create a prevailing locking torque characteristic between the internal threads of the nut and a cooperating fastener such as a threaded bolt.

The distortion of the threads of the nut can be accomplished either by pressing the nut into the workpiece with a tool or by drawing the nut into the workpiece with a cooperating threaded male fastener. In the first case, the threaded bore develops an ability to provide a prevailing locking torque characteristic as the tool forces the nut into the hole before engagement with a cooperating fastener. In the second case, the threaded bolt in normal engagement with the nut initially, gradually experiences greater and greater resistance as the joint clamps together and the nut is drawn into the hole in the workpiece.

The irregular outer surface of the nut in addition to causing the distortion of the threaded bore as the nut is inserted into the workpiece also precludes rotation of the nut within the workpiece as the nut is engaged by the threaded bolt and also secures the nut against rotation in the workpiece after the joint has been assembled. In the drawings:

FIG. 1 is an elevational view showing the rotation resistant nut of the present invention;

FIG. 2 is a plan view of the nut of the present invention;

FIG. 3 is an elevational view partly in section showing the nut of the present invention prior to installation in a joint;

FIG. 4 is a view similar to FIG. 3 showing the nut of the present invention assembled in a joint;

Figure 5:
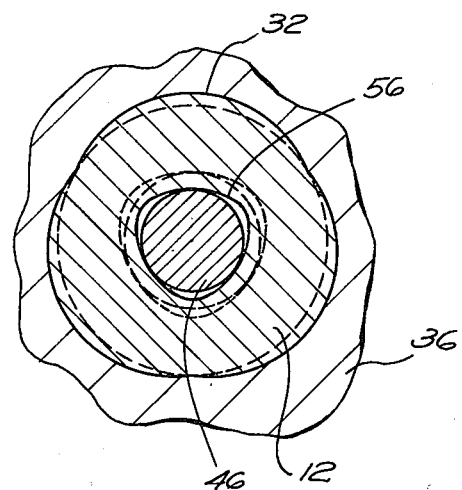
FIG. 5 is a sectional view taken on the line 5—5 of FIG. 4.

With reference now to the drawing, and particularly FIGS. 1 and 2, the rotation resistant fastener 10 of the present invention includes a nut body 12 having a longitudinally extending through bore 14 provided with an internal thread configuration 16. Nut body 12 is formed with a shoulder segment 18 at one end, an intermediate segment 20 having an irregular exterior configuration and an end segment 22 having a cylindrical configuration.

As best seen in FIG. 2, the irregular exterior configuration of segment 20 of the nut body 12 is formed with a plurality of lobular protrusions 24, 26 and 28 which extend longitudinally substantially along the whole extent of the intermediate segment 20 of the nut body. Each of the lobular protrusions 24, 26 and 28 is arcuate throughout substantially its entire arc length so that each lobular protrusion comprises a pair of low points, shown at 30, which are points of minimum radial projection, and a high point, shown at 32, which is a point of maximum radial projection intermediate the low points 30. It should be noted that each low point 30 lies on the periphery of an imaginary circle shown in dotted lines in FIG. 2, located through the nut body 12 and substantially all of the circumference of this imaginary circle except for the low points has a lobular protrusion projecting therearound.

Located at the leading end of intermediate segment 20 are a plurality of additional radial protrusions 24a, 26a, and 28a, which are aligned, respectively, with lobular protrusions 24, 26, and 28. Protrusions, 24a, 26a, and 28a are arcuate throughout substantially their entire arc lengths and follow the contour of protrusions 24, 26, and 28, respectively; that is, they originate from the same low points but project to a greater radial extent than protrusions 24, 26, and 28 and accordingly have a different high point.

Protrusions 24a, 26a, and 28a can be developed as a result of the manufacturing technique employed in fabricating nut body 12 and can have a beneficial effect on facilitating insertion of nut body 12 into a workpiece. In actual practice, protrusions 24a, 26a and 28a extend only slightly beyond protrusions 24, 26, and 28. However, for the sake of clarity the radial extension of protrusions 24a, 26a, and 28a has been exaggerated in the drawing.

As best seen in FIG. 2, the outer diameter of end segment 22 is less than the minimum diameter, as shown by the dotted line, of segment 20 and the shoulder 18 extends radially beyond the maximum protrusion 32 of the lobular protrusions 24, 26 and 28 so that shoulder 18 provides a clamping surface when the nut 10 is inserted into a hole in a workpiece.

Reference is now made to FIGS. 3 and 5 wherein the nut 10 of the present invention is shown prior to, and after, installation in a joint assembly 34. The joint assembly 34 may comprise a plurality of workpieces to be joined and illustratively two workpieces 36 and 38 are shown. A threaded male fastener, such as a bolt 40, having a head 42 with a wrenching surface and a shank member 44 threaded, as at 46, with an external thread configuration to mate with the internal thread configuration 16 of nut 10 completes the joint assembly. Preferably, the nut bore 14 is countersunk as at 48 for ease of alignment of the bolt shank 44 within nut 10.

To assemble the workpieces 36 and 38 in a joint assembly 34 utilizing the nut 10 of the present invention, a through bore 50 having an internal diameter slightly larger than the external diameter of the shank 44 of bolt 40 is provided in workpiece 38 closest to the head 42 of bolt 40. An axially aligned through bore 52 is provided in workpiece 36 having an internal diameter greater than the minimum diameter of segment 22 as shown by the dotted line in FIG. 2 and less than the major diameter of the nut 10 taken at the maximum degree of extension 32 of a lobular protrusion 24, 26 or 28. The internal diameter of through bore 52 is selected so that an interference fit results between the wall of through bore 52 and segment 20 of nut 10. Thus when nut 10 is forced into the bore 52 the nut body is radially inwardly deformed in a substantially elastic manner.

Installation of the nut 10 and assembly of the joint 34 may be accomplished by either pressing the nut 10 in bore 52 prior to the engagement of bolt 40 or by inserting the bolt 40 through the workpieces 38 and 36 and threadably engaging the nut 10 thereon. When assembling the joint by the latter method, rotation of the bolt 40 draws the nut 10 into the bore 52. In either method of installation the interference fit between the exterior of the nut body 12 and bore 52 results in a substantially elastic radially inward deformation of the nut body which distorts the internal thread configuration 16 of the nut. This thread distortion provides a prevailing locking torque between the nut and the bolt to preclude undesired backing off of the bolt.

It is also to be understood that depending upon the choice of materials for the nut and the workpiece the interference fit may cause outward deformation in the workpiece itself which would produce desirable tensile stresses in the workpiece around the receiving bore.

Nut 10 is fully seated within bore 52 of workpiece 36 when shoulder 18 abuts against the exposed surface 54 of workpiece 36. While only two workpieces 36 and 38 have been shown, with workpiece 36 having a thickness sufficient to fully accommodate segments 20 and 22 of nut body 12, it is to be expressly understood that the nut 10 of the present invention may be utilized to join more than two workpieces to form a joint assembly and that where the thickness of the outermost workpiece closest to the nut is insufficient to accommodate the full longitudinal length of the nut body then bore 52 may be extended through one or more adjacent workpieces so that the full depth of penetration of the nut may be realized. The degree of insertion of nut 10 in the joint assembly must be sufficient to enable shoulder 18 to contact the workpiece to transmit a clamping force to the joint.

As best seen in FIGS. 4 and 5, when the nut 10 is fully engaged on the bolt 40 and seated within the receiving bore 52 of the workpiece 36 the interference fit between the nut and the receiving bore 52 radially inwardly distorts the nut body 12 to distort the internal thread configuration of the nut. The deformation caused on the internal configuration is at a maximum, as shown in FIG. 5, in an area 56 radially inwardly from the point 32 of maximum protrusion of a lobular protuberance 24, 26 or 28 so that the crest of the internal thread configuration at point 56 is forced deeper into the root of a thread on the bolt 40. This results in a greater contact area between the flanks of the threads on the nut against the flanks of threads on the bolt and appreciably increases the torque necessary to rotate the bolt with respect to the nut.

Figure 6:
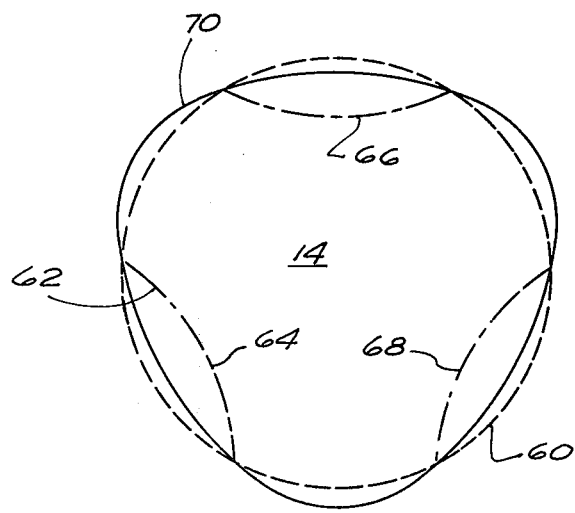
FIG. 6 is a diagrammatic representation of the nut bore.

Reference is now made to FIG. 6 which diagrammatically represents the various conditions of the nut bore 14. The initially circular bore is represented by the broken line 60 and this circular condition deforms elastically into the configuration shown by the dot-dash line configuration 62 when the nut is inserted into a workpiece by a tool. This configuration includes radially inwardly projecting lobes 64, 66, 68 opposite each of the lobes 24, 26 and 28. Each of the inwardly deflected lobes has a maximum point of projection which is radially spaced from the maximum point of projection of the exterior lobes. At the low points of the exterior lobes 24, 26 and 28 either a clearance or a slight interference occurs and, therefore, no inward projection is formed in the bore 14.

As a bolt is threaded into the nut bore, segment 20 of the nut body is expanded radially and it is believed that the bore assumes the solid line configuration shown at 70. This radially outward expansion also causes the low points adjacent the exterior lobes to expand against the hole in the workpiece to provide an anti-rotation characteristic. Because the deformation of the nut body is elastic, a high reusability characteristic results as the nut again assumes the dot-dash line configuration 62.

Of course, if the nut is installed by being pulled into the hole by a bolt, the dot-dash line configuration 62 is not achieved even though the nut tries to deform into that configuration. Instead the solid line configuration 70 is obtained.

Because a greater installation torque is necessary in order to fully engage the bolt within the nut 10 and, this higher torque necessary to cause relative rotation between the nut and the bolt provides a prevailing locking torque upon the bolt when the nut and bolt are in a completed joint assembly to effectively preclude backing off of the bolt due to vibration and insure physical integrity of the joint. The interference fit between the nut and workpiece 36 also precludes rotation of the nut within bore 52.

As noted above, the radially inward deformation imparted to the nut body 12 when it is fitted within a receiving bore in a workpiece is essentially an elastic deformation so that when the nut is removed from a workpiece to disassemble the joint the nut body substantially returns to its initial shape. This substantially elastic property results because of the irregular shape of the segment 20 of the nut body. The arcuate shaped protuberances allows some of the material of the nut body to flow circumferentially about the nut body when the nut is inserted by an interference fit within a receiving bore. Thus the amount of material caused to flow is maintained at a minimum and the radially inward deformation imparted to the nut body provides sufficient deformation to the internal thread configuration so that a prevailing locking torque is imparted on a male fastener threadably engaged within the nut.

The interference fit between the nut and the receiving bore also resists the tendency of the nut to rotate within the workpiece and essentially locks the nut within the workpiece. This dual locking action, i.e., the nut in the workpiece and the male fastener within the nut, insures a joint assembly which exhibits a high resistance to any tendency for nut or bolt back off. Thus the joint assembly maintains a uniform clamping load even during extensive vibration.

Additionally, because the nut is deformed in a substantially elastic manner the joint assembly may be assembled and disassembled through a repeated number of cycles without substantial impairment to the ability of the nut to maintain a prevailing locking torque.

Another important advantage achieved by the nut of the present invention is that the strength of the bolt itself, because of a redistribution of the load imparted to the bolt, results. This is very important because it increases the fatigue life of the bolt.

With conventional nut and bolt combinations the axial load in the bolt is taken up by the threads of the nut adjacent the bearing surface of the nut. Very little of the load is taken up by the nut at its free end face. With a nut constructed according to the present invention, the segment 20 of the nut of reduced cross-sectional area is engaged within a receiving bore in the workpiece and this segment of the nut stretches with the bolt so that this segment of the nut takes up about 30% of the load. This redistributes the load normally assumed by the bolt itself thus increasing bolt fatigue life.

It is thus seen that the present invention provides a rotation resistant nut which effectively maintains a prevailing locking torque on a threaded male fastener when installed in a joint assembly and which exhibits a high reusability factor to maintain a desired degree of prevailing locking torque for repeated applications.

What is claimed is:

1. A fastener assembly comprising a first workpiece having a smooth surface bore extending therethrough and an insert-type rotation resistant nut received in said bore, said nut comprising a nut body having a threaded bore extending therethrough, the exterior surface of said nut body including an intermediate segment having a generally smooth, continuous surface and an end segment, said intermediate segment formed with a plurality of generally lobular radially outwardly extending protrusions extending throughout substantially the entire axial length of said intermediate segment, each of said protrusions being arcuate throughout substantially its entire circumferential extent and including a pair of points of minimum radial projection and a point of maximum radial projection, said intermediate segment having an interference fit with said bore in said workpiece such that said workpiece elastically deforms said threaded bore forming a plurality of radially inwardly extending protrusions, each of said inwardly extending protrusions including a point of maximum radial projection radially adjacent said points of maximum projection of said outwardly extending protrusions, said inwardly extending protrusions being spaced apart by relatively undeformed portions of said threaded bore including a segment adjacent said points of minimum projection of said outwardly extending protrusions, said points of maximum projection of said inwardly extending protrusions being adapted to have an interference fit with a mating bolt and said relatively undeformed portions of said threaded bore being adapted to be expanded against said bore in said workpiece when engaged with a mating bolt to resist rotation of said nut relative to said workpiece, said end segment of said nut having a diameter less than that of said intermediate segment to facilitate insertion of said nut into said workpiece.

2. A fastener assembly in accordance with claim 1 wherein one end of said nut body is formed with a radially projecting bearing surface.

3. A fastener assembly in accordance with claim 1 wherein a plurality of additional generally radial protrusions are formed at the leading end of said lobular protrusions, said additional radial protrusions also being generally arcuate and having a point of maximum radial projection greater than the point of maximum radial projection of said lobular protrusions.

4. A fastener assembly in accordance with claim 3 wherein each of said additional radial protrusions has points of minimum radial projection generally coincident with said points of minimum radial projection of said lobular protrusions.

5. A rotation resistant nut adapted to be inserted in a receiving bore in a workpiece comprising a nut body having a threaded bore therethrough, at least a portion of the nut body provided with an irregular exterior configuration, the major diameter of said portion of the nut body provided with an irregular exterior configuration being greater than the internal diameter of the receiving bore of the workpiece in which the nut is to be inserted whereby said nut body is radially inwardly deformed when it is inserted in said receiving bore thereby to distort the internal thread configuration of said nut to provide a prevailing locking torque characteristic on a male threaded fastener cooperatively engaged within said nut, said irregular exterior configuration includes a plurality of lobular protrusions circumferentially spaced about said nut body, each of said lobular protrusions being arcuate throughout substantially its entire arc length so that each protrusion comprises a pair of low points of minimum radial projection and a high point intermediate said low points of maximum radial protrusion, and a plurality of additional radial protrusions located at the leading end of said lobular protrusions, said additional protrusions being arcuate throughout substantially their entire arc lengths and following the contour of said lobular protrusions such that said additional protrusions comprise a pair of low points of minimum radial projection coincident with the low points of minimum radial projection of said lobular protrusions and a high point intermediate said low points projecting outwardly to a greater radial extent than the maximum radial projection of said lobular protrusions.

* * * * *